US006146711A

United States Patent [19]

Courtoy et al.

[11] Patent Number: 6,146,711
[45] Date of Patent: *Nov. 14, 2000

[54] CURABLE COATING COMPOSITION FOR SHEET GOODS

[75] Inventors: Jean-François Courtoy; Claude Charest, both of St-Bruno de Montarville, Canada

[73] Assignee: Domco Industries Ltd, Farnham, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,252

[22] Filed: Aug. 5, 1997

Related U.S. Application Data

[62] Division of application No. 08/394,483, Feb. 27, 1995, Pat. No. 5,679,721.

[51] Int. Cl.$^7$ ................................. C08F 2/46; C08J 7/18; B05D 3/02; S05D 3/06
[52] U.S. Cl. .......................... 427/493; 427/506; 427/498; 427/512; 427/520; 427/244; 427/373; 427/385.5; 427/393.5; 156/79; 156/244.17; 156/244.23; 156/244.24; 156/272.2; 156/275.5
[58] Field of Search ................................ 427/493, 498, 427/506, 512, 520, 244, 373, 393.5, 385.5; 156/77, 78, 79, 244.17, 244.23, 272.2, 272.8, 273.5, 275.5

[56] References Cited

U.S. PATENT DOCUMENTS

| | | | |
|---|---|---|---|
| 3,575,925 | 4/1971 | Skoultchi | 260/47 |
| 3,935,330 | 1/1976 | Smith et al. | 427/41 |
| 3,962,009 | 6/1976 | Minami et aal. | 427/595 |
| 4,100,318 | 7/1978 | McCann et al. | 428/159 |
| 4,206,025 | 6/1980 | Vrancken et al. | 204/159.16 |
| 4,210,567 | 7/1980 | Kösters | 260/31.8 R |
| 4,216,267 | 8/1980 | Lorenz et al. | 428/412 |
| 4,217,396 | 8/1980 | Heckles | 428/500 |
| 4,221,645 | 9/1980 | Adelmann et al. | 204/159.14 |
| 4,309,331 | 1/1982 | Graham | 260/30.6 R |
| 4,323,592 | 4/1982 | Sasaki et al. | 427/54.1 |
| 4,333,809 | 6/1982 | Schreckenberg et al. | 204/159.14 |
| 4,380,606 | 4/1983 | Coran et al. | 525/196 |
| 4,393,187 | 7/1983 | Boba et al. | 528/60 |
| 4,452,838 | 6/1984 | Ueno | 428/36 |
| 4,554,214 | 11/1985 | Ichinomiya et al. | 428/423.1 |
| 4,559,382 | 12/1985 | Martens et al. | 524/535 |
| 4,598,009 | 7/1986 | Christie et al. | 428/172 |
| 4,675,216 | 6/1987 | DuForest et al. | |
| 4,935,333 | 6/1990 | Kimoto et al. | 430/285 |
| 5,096,401 | 3/1992 | Tamura et al. | 156/272.2 |
| 5,296,340 | 3/1994 | Tsukada et al. | 427/504 |
| 5,466,317 | 11/1995 | Lause et al. | 156/79 |
| 6,013,329 | 1/2000 | Berenger | 427/493 |
| 6,017,640 | 1/2000 | Mutheah et al. | 427/493 |

FOREIGN PATENT DOCUMENTS

| | | |
|---|---|---|
| 2 379 323 | 2/1978 | France . |
| 2 542 260 | 3/1984 | France . |
| 4-89807 | 3/1972 | Japan . |
| 54-120657 | 9/1979 | Japan . |
| 4-138250 | 5/1992 | Japan . |

OTHER PUBLICATIONS

Translation of JP 04–89807, Mar. 1992.
Translation of JP 04–138250, May 1992.
Translation of JP 54–120657, Sep. 1979.
*Chemical Abstracts*; vol. 117, No. 24; Dec. 14, 1992; Columbus, Ohio, US; Abstract No. 235944, XP002002663. To Michio Arai, Japanese patent JP 90–261138, Sep. 29, 1990.
*Database WPI*; Section Ch, Week 9218; Derwent Publications Lt.; London, GB; Class A14, AN 92–147672, XP002002666. Abstract of Japanese patent JP 4089809 to Nippon Polytechkk on Mar. 24, 1992.
*Journal of Applied Polymer Science*, vol. 28, No. 6; Jun. 1983; New York, US; pp. 2083–2092, XP002002661; T.N. Bowmer et al.; "Radiation crosslinking of poly(vinyl chloride) with trimethylolpropanetrimethacrylate. II. Dependence on radiation dose and blend composition" see the whole document.
*Journal of Applied Polymer Science*; vol. 28, No. 11; Nov. 1983; New York, US; pp. 3527–3548, XP002002662; T. N. Bowmer et al.; "Radiation crosslinking of poly(vinyl chloride) with trimethylolpropanetrimethacrylate. IV. Effects of diundecyl phthalate: dependence of physical properties on composition"; see Experimental; see Blends B–D.
*Chemical Abstracts*; vol. 98, No. 16; Apr. 18, 1983; Columbus, Ohio, US; Abstract No. 127182, XP002002664. Czech patent to J. Stepek et al, CS 192252 B Sep. 25, 1981.
*Chemical Abstracts*; vol. 92, No. 8; Feb. 25, 1980; Columbus, Ohio, US; Abstract No. 59756d; p. 39, XP002002665. Mutakami et al JP 79–120,657 Sep. 19, 1979.
R. Elliott Asay, Marc D. Hein and Don L. Wharry, "Blends and Alloys of Vinyl—Technology and Applications", *Journal of Vinyl Technology*, Jun. 1993, vol. 15, No. 2, at p. 76.

*Primary Examiner*—Marianne Padgett
*Attorney, Agent, or Firm*—Kinney & Lange

[57] ABSTRACT

A wear layer is applied to a flooring material to yield a product having superior properties. The wear layer is applied to the flooring material using a coating composition comprising (i) a polyvinyl chloride (PVC) resin, (ii) an acrylic or methacrylic compound and (iii) a radiation-reactive urethane oligomer, which composition is substantially or completely free of internal or external plasticizers, heating to heat-cure the coating composition and irradiating the composition to radiation-cure the coating composition.

13 Claims, No Drawings

CURABLE COATING COMPOSITION FOR SHEET GOODS

This is a divisional of application Ser. No. 08/394,483, filed Feb. 27, 1995, now U.S. Pat. No. 5,679,721 issued Oct. 21, 1997.

FIELD OF THE INVENTION

This invention relates to a heat-curable and radiation-curable composition for coating sheet materials, more particularly but not exclusively for top coating of resilient vinyl flooring materials, and to sheet materials coated with the cured composition. The invention also extends to a process for preparing such coated sheet materials.

BACKGROUND OF THE INVENTION

Wear layer surfaces of vinyl flooring products are usually prepared from plastisols, which are dispersions of fine particles of resins in a plasticizer. Most plastisols for vinyl flooring products are formulated using polyvinyl chloride (PVC) emulsion resins mixed with primary and secondary plasticizers, extenders, stabilizers and other additives. After being applied to a substrate, for example a felt substrate or a glass fleece, by spread coating, the layer of plastisol is fused by heating to an elevated temperature. Wear layer surfaces of vinyl flooring products can also be prepared with a clear or colored powdered dry blend as described in French patent FR 2,542,260 published Sep. 14, 1984. These dry blend powders are prepared from polyvinyl chloride (PVC) suspension resins, plasticizers, stabilizers, extenders and other additives. They are prepared in a Henschel type mixer. The dry blend powder is applied to a felt or vinyl substrate and is fused by heating to an elevated temperature.

Clear wear layer surfaces can also be prepared by mixing polyvinyl chloride (PVC) suspension resins, plasticizers, stabilizers, extenders and other additives in a Banbury mixer and calendering or extruding the product to various gauges. This calendered sheet is then laminated to any one of various substrates, for example a PVC based film, a felt, a glass fleece, or the like.

Thermoplastic vinyl wear layers made from polyvinyl chloride (PVC) plastisols or from powdered dry blends or a high shear mixer (e.g. Banbury mixer) show various limitations and disadvantages, such as insufficient gloss retention, insufficient wear and abrasion resistance, stain resistance, scuff resistance, tear resistance, gauge resistance and resistance to various chemical agents. Some of these problems are additionally aggravated by migration of plasticizers towards the surface of the wear layer.

In order to improve wear properties of thermoplastic vinyl layers, various modifications to plastisol, dry blend and high shear mixer compositions have been proposed, mostly by changing the amount ad type of plasticizers. Changing the amount and type of external plasticizers has not produced any substantial improvements. External plasticizers conventionally used for PVC compositions include dialkyl phthalates, for example dioctyl phthalate. These conventional plasticizers have proven unsatisfactory for various reasons, one of which is that they have a tendency to migrate to the surface and exude from the surface. This leads to undesirable characteristics, including staining. It is also known to plasticize PVC internally. This is done, for instance, by copolymerizing a small amount of ethylene or propylene with the vinyl chloride, so that there is obtained PVC containing a small amount of ethylene or propylene incorporated into the polymer backbone. The small amount of ethylene or propylene may be up to about 10% of the total weight of the polyvinyl chloride (PVC) polymer. Internal plasticization has proved to be unsatisfactory in view of many limitations as to applications, formulations and performance. Plastisols having a resin component other than polyvinyl chloride (PVC) have also been proposed (see, for example, U.S. Pat. No. 4,210,567, U.S. Pat. No. 4,309,331 and U.S. Pat. No. 4,380,606), but this has not eliminated all the above mentioned problems.

To obtain a surface with acceptable wear properties, a thin top coat layer, usually made of a polyurethane, has been added over the plasticized polyvinyl chloride (PVC) coating (see, for example, U.S. Pat. No. 3,935,330, U.S. Pat. No. 4,100,318, U.S. Pat. No. 4,216,187, U.S. Pat. No. 4,217,396, U.S. Pat. No. 4,393,187 and U.S. Pat. No. 4,598,009). Although showing usually satisfactory mechanical resistance, these top coatings are not themselves free of problems.

The additional top coating and the process by which it is applied may adversely affect properties of an underlying foamable plastisol layer by damaging foam cells and causing reduction in the level of embossing. Also, since the polyurethane layer is expensive, it is usually thin. In some cases it may be too thin to prevent the migration of plasticizers from the base layer to the surface of the coating. Such migration may be prevented by increasing the thickness of the polyurethane top layer, but this makes the flooring material more expensive.

Most top layers of polyurethane are prepared by covering the polymer base layer, which may be formed for example from a polyvinyl chloride (PVC) plastisol, a polyolefin, a polyester, a polyamide, a polyepoxy or a polyacrylate, with a liquid composition of monomers (U.V. curable) or polymers (solvent or water based) which composition is subsequently cured at an elevated temperature or U.V. cured to produce a crosslinked, thermoset, mechanically resistant polyurethane coating. The liquid composition of monomers or polymers has a low viscosity which decreases with increasing temperature, before the top layer becomes solid by crosslinking. As a result, the top coating of polyurethane is usually of an uneven thickness, due to the low viscosity monomer or polymer composition flowing into any embossed valleys. Another disadvantage, with a foamable material, is that the hot melt viscosity of the polyurethane composition is too low to prevent the escape of gases from the underlying foamed or foaming plastisol layer. This results in blistering and pin holes of the polyurethane layer. To prevent this from happening, in the past a layer of a composition having a high melt viscosity has been situated between the foamed or foaming plastisol layer and the polyurethane composition. A suitable composition having a high melt viscosity that has been used for this purpose is a plasticized high temperature melt viscosity PVC resin.

FR 2,379,323, published Sep. 1, 1978, discloses a top coat composition that contains, additionally to the usual polyurethane polymers, an ethylenically unsaturated compound. After being applied to a foamable substrate but prior to being thermally cured, the composition is irradiated with U.V. light or an ionizing radiation or is heated to a low temperature by infrared radiation. This causes polymerization of the ethylenically unsaturated compound, which increases the hot melt viscosity of the composition and changes it to a solid state. The partially crosslinked composition creates a high temperature melt flow barrier film that prevents the escape of gases from the foamed underlayer when the latter is fused at a high temperature. The ethylenically unsaturated compounds used for this purpose are all very expensive monomers.

A similar two-step coating process is disclosed in U.S. Pat. No. 3,935,330. A coating composition, which comprises both thermally and radiation-curable components, is first partially cured by exposing it to an ionizing or non-ionizing radiation and the cure is then completed by a thermal treatment. Ionizing radiation is a radiation produced by an electron beam or electron generating sources. Non-ionizing radiation is a radiation produced by Carbon ARC, Tungsten filament lamps, sunlamps, lasers, Mercury arc, Xenon arcs or any other source of ultra violet and visible light radiation. Including thermally curable components into the coating composition and adding the step of thermal curing improves properties of the coating compared with coatings cured by radiation only. U.S. Pat. No. 3,935,330 is clearly concerned with coatings to be applied to wood and metal, and this method of processing is not practical for foaming products.

SUMMARY OF THE INVENTION

It is an object of the invention to provide a new composition that can be used, for example, for coating a wall covering or a tarpaulin or, more preferably, for preparing a wear layer for vinyl or other flooring materials, which wear layer is substantially free of disadvantages of wear layers known in the prior art and does not require an additional protective top coating.

It is another object of the invention to provide a method of coating a substrate with the new coating composition, to prepare resilient flooring materials substantially free of disadvantages of materials known in the prior art and which do not require an additional protective top coating.

Thus, according to one aspect, the invention provides a radiation-curable coating composition comprising a polyvinyl chloride (PVC) resin, an acrylic or methacrylic compound and a radiation-reactive urethane oligomer.

According to another aspect, the invention provides a heat-curable and radiation-curable coating composition which comprises a polyvinyl chloride (PVC) resin that is substantially or completely free from internal or external plasticizers, and an acrylic or methacrylic compound.

According to yet another aspect, the invention provides a transparent, radiation-curable flexible sheet composed of a polyvinyl chloride resin that is substantially or completely free from internal or external plasticizers and is solvated with an acrylic or methacrylic compound.

According to another aspect, the invention provides an article comprising a material coated with a heat-cured and radiation-cured composition comprising a polyvinyl chloride (PVC) resin, an acrylic or methacrylic compound and a radiation-reactive urethane oligomer.

According to still another aspect, the invention provides an article comprising a material coated with a heat-cured and radiation-cured composition comprising a polyvinyl chloride (PVC) resin that is substantially or completely free from internal or external plasticizers, and an acrylic or methacrylic compound.

According to yet another aspect, the invention provides an article comprising a material coated with a transparent, radiation-curable flexible composition composed of a PVC resin that is substantially or completely free from internal or external plasticizers solvated with an acrylic or methacrylic compound.

According to yet another aspect, the invention provides a flooring material comprising a substrate and a top coating, said top coating prepared by thermal fusing and radiation-curing of a coating composition comprising from 35 to 140 parts by weight of a polyvinyl chloride emulsion resin, from 30 to 80 parts by weight of an acrylic or methacrylic compound and from 4 to 65 parts by weight of a radiation-curable urethane oligomer.

According to still another aspect, the invention provides a flooring material comprising a substrate and a top coating, said top coating prepared by thermal fusing and radiation-curing of a coating composition comprising from 75 to 140 parts by weight of a polyvinyl chloride (PVC) suspension resin, from 35 to 80 parts by weight of an acrylic or methacrylic compound and from 4 to 65 parts by weight of a radiation-reactive urethane oligomer.

According to another aspect, the invention provides a process for coating a material, which process comprises applying to the material a coating composition comprising a polyvinyl chloride (PVC) resin, an acrylic or methacrylic compound and a radiation-reactive urethane oligomer, heating to heat-cure the coating composition and irradiating the composition to radiation-cure the coating composition. The composition can be applied to the material before or after it is heated.

According to yet another aspect, the invention provides a process for coating a material, which process comprises applying to the material a heat-curable and radiation-curable coating composition which comprises a polyvinyl chloride (PVC) resin that is substantially or completely free from internal or external plasticizers, and an acrylic or methacrylic compound, heating to heat-cure the coating composition and irradiating the composition to radiation-cure the coating composition. The composition can be applied to the material before or after it is heated.

DETAILED DESCRIPTION OF THE PREFERRED EMBODIMENTS OF THE INVENTION

In one embodiment, the composition according to the invention is prepared and applied to a substrate as a low-viscosity mixture, in the manner known to those skilled in the art. After being applied to the substrate, the coating composition is heated to a temperature and for a period of time sufficient to fuse the composition, for example about 2 minutes at about 200° C. The time and temperature required to gel and fuse the composition will depend upon the particular composition but can readily be determined by routine testing. If the substrate is a foamable substrate, for example, a plastisol containing a heat-activated blowing agent, the fused coating composition and the expanded substrate can be chemically and/or mechanically embossed or otherwise formed. Thereafter, the coated composition is immediately exposed to a non-ionizing or ionizing radiation, for a period of time necessary to crosslink the crosslinkable components of the composition. The crosslinking freezes any embossing and transforms the flexible, thermoplastic layer of gelled composition into a clear, high modulus, stain and abrasion resistant, thermoset film.

In another embodiment, the composition is prepared as a dry blend or mixture. The dry blend composition is formed into a sheet on hot calender rolls to an appropriate thickness and laminated to a substrate. The substrate can be, for example, a felt, a glass fleece or a layer of a suitable polymeric material such as polyvinyl chloride (PVC), polyolefin, polyester, polyamide, polyepoxy, polyacrylate or the like. Infrared heating is usually used in the laminating step. The hot laminated film is then embossed and immediately exposed to an ionizing or non-ionizing radiation, for a period of time necessary to crosslink the reactive components. This freezes the design obtained by embossing and converts the flexible, thermoplastic film into a tough, high modulus, stain and abrasion resistant, clear film.

Another way to produce a sheet on hot calender rolls is to use a high sheer mixer such as a two roll mill, a Banbury mixer or an extruder. These items are used to transform the raw materials into a composition ready for application onto hot calender rolls. The Banbury mixer, two roll mill or extruder solvates the resin with the acrylic or methacrylic compound and radiation reactive oligomer and forms a hot high viscosity paste. This paste is then fed to calender rolls (Encyclopedia of PVC by NASS, second edition, vol. 3).

The composition according to the invention does not require any solvent or diluent components which might be released into the atmosphere during gelling and curing. The composition also requires no external nor internal plasticizers, so that no degradation of the coating due to migration of plasticizers towards the surface of the layer can occur. The compositions of the invention are therefore normally completely or substantially free of any internal or external plasticizer. Coatings prepared from the composition of the invention have a superior tensile strength, scuff resistance, chemical and stain resistance as well as excellent gloss retention.

The composition may contain a heat stabilizer, suitably in an amount from about 0.5 to 10 parts by weight.

Due to its outstanding mechanical, wear and stain resistance, the wear layer prepared from the composition of the invention does not require a top protective layer. This makes the resulting flooring material less costly than vinyl flooring materials comprising a polyurethane protective layer. The composition of the invention can be applied to thermoplastic vinyl layers, to provide a top protective layer. Such a layer possesses excellent wear properties and is less costly than traditional polyurethane protective layers. The composition of the invention can also be applied as a wear layer to materials other than thermoplastic vinyl.

The composition according to the invention can be prepared either in the form of a low viscosity paste, a dry blend mix or a polyvinyl chloride (PVC) and monomer mix using a high shear mixer, such as a Banbury mixer.

In one embodiment of the invention, a low viscosity paste comprises from 35 to 140, preferably from 55 to 120, most preferably about 100 parts by weight of a polyvinyl chloride (PVC) emulsion resin, from 30 to 80, preferably from 50 to 60, most preferably about 55 parts by weight of an acrylic or methacrylic monomer, from 0.5 to 65, preferably from 4 to 20, most preferably about 7.5 parts by weight of a urethane radiation-reactive oligomer, if required from 0.5 to 10, preferably from 1 to 7, most preferably about 6.0 parts by weight of a heat stabilizer and, if required, from 0.1 to 10, preferably from 0.75 to 4, most preferably about 1.0 parts by weight of a photoinitiator. The preferred low viscosity paste may contain further additives, such as an air release agent, a U.V. light stabilizer and an antioxidant. The amount of the air release agent is normally in the range of from 0.5 to 5.0, preferably from 0.5 to 3.0, most preferably about 0.5 parts by weight. The amount of the antioxidant is from 25 to 1,000, preferably from 100 to 700, most preferably about 500 ppm.

The low viscosity paste should have a viscosity of from 200 cps to 4000 cps, preferably from 600 cps to 2000 cps, most preferably about 800 cps, as measured by Brookfield viscometer model HBT at 20 rpm and 26° C.

In another embodiment of the invention, a dry blend mix comprises from 75 to 140, preferably from 85 to 130, most preferably about 100 parts by weight of a polyvinyl chloride (PVC) resin, from 35 to 80, preferably from 40 to 70, most preferably about 50 parts by weight of an acrylic or methacrylic monomer, from 0.5 to 65, preferably from 5 to 30, most preferably about 15 parts by weight of a urethane radiation-reactive oligomer, if required from 0.5 to 10, preferably from 1 to 6, most preferably about 4.0 parts by weight of a heat stabilizer and, if required, from 0.25 to 15, preferably from 1 to 4, most preferably about 2.0 parts by weight of a photoinitiator. The dry blend may contain further additives, such as a lubricant and a drying agent. The amount of the lubricant is normally from 0.5 to 3.5, preferably from 0.75 to 3.0, most preferably about 1.0 part by weight. The amount of the drying agent is normally from 1.0 to 10.0, preferably from 2.5 to 6.5, most preferably about 3.5 parts by weight.

The dry blend mixture can be prepared by admixing the various ingredients under high shear and subjecting them to gentle heat. As the mixture warms, the polyvinyl chloride (PVC) particles absorb the liquid materials present, so that there is formed a dry powder composed of polyvinyl chloride particles in which the liquid materials are absorbed. The particles tend to be somewhat sticky, owing to residual amounts of liquid material on the surface of the particles. To combat this stickiness there can be added to the mixture a drying agent, for example a further small quantity of PVC powder or Cab-O-Sil. The dry blend mixture is then a stable powder, somewhat reminiscent of sand in appearance, that can be stored until required for use.

In another embodiment of the invention, a polyvinyl chloride (PVC) suspension resin is mixed with the acrylic or methacrylic monomer, the radiation-reactive urethane oligomer, a heat stabilizer, if required, a photoinitiator, if required and a lubricant, if required, in a high shear mixer, such as a Banbury mixer, and then calendered on hot rolls to form a sheet which can be readily laminated. Apart from the presence of a lubricant, for example zinc stearate, the components and amounts present in the high shear mixture may be the same as the dry blend mixture. The effect of the high shear on these components, however, is to cause the formation of a hot viscous mass that must be used immediately. The high shear mixture is therefore fed directly from the high shear mixer to calender rolls to form the sheet.

Polyvinyl chloride (PVC) emulsion resins which may be used in the compositions of the invention are those which are normally used for clear layer applications. They should have a relative viscosity from 2.05 to 3.40, preferably from 2.30 to 2.65. Examples of resins that are suitable for use in compositions of the invention and are commercially available include Oxy 605, Oxy 75HC, Oxy 1755, Oxy 1757 and Oxy 80HC, all products of Occidental Chemical Ltd. Similar products are available from other manufactures, such as B.F. Goodrich, Borden Chemicals, Norsk Hydro (Pevikon resins), Solvic, Atochem, Hüls and Goodyear. Oxy resins produced by Occidental Chemical Ltd. are preferred.

Polyvinyl chloride (PVC) suspension resins which may be used in compositions of the invention are polymers which have a relative viscosity from 1.56 to 2.52, most preferably about 1.6. Examples of such resins are Oxy 160 from Occidental Chemical Ltd. or VC 47B, VC 58, VC 95 PM, VC 100 PM and VC 100 T, products of Borden Chemicals. Similar resins are available from other manufactures, such as B.F. Goodrich, Borden Chemicals, Norsk Hydro (Pevikon resins), Solvic, Atochem, Hüls and Goodyear. Of the above resins those produced by Borden Chemicals are preferred. Oxy 160, product of Occidental Chemical Ltd. is particularly preferred.

Acrylic (including methacrylic) compounds suitable for use in the compositions of the invention include mono-, di- and multi-functional acrylic monomers. Examples of suitable commercially available acrylic monomers include esters such as 2-phenoxyethyl acrylate (SR-339), tetrahydrofurfuryl acrylate (SR-285), isodecyl acrylate (SR-395), isobornyl acrylate (SR-506), 2-(2-ethoxyethoxy)ethyl acrylate (SR-256), polyethylene glycol 400 diacrylate (SR-344), tripropylene glycol diacrylate (SR-306), polyethylene glycol 200 diacrylate (SR-259), dipentaerythritol monohydroxy pentacrylate (SR-399), isodecyl methacrylate (SR-242), ethylene glycol dimethacrylate (SR-206), methacrylate terminated oligomer C14-C15 (SR-2100), ethoxylated trimethylol propane triacrylate (SR-454), ethoxylated bisphenol A dimethacrylate (SR-348), polyethylene glycol 600 dimethacrylate (SR-252), 1,6-hexanediol dimethacrylate (SR-239), isobornyl methacrylate (SR-423), tetraethylene glycol dimethacrylate (SR-209), trimethylol propane trimethacrylate (SR-350), triethylene glycol dimethacrylate (SR-205), polyethylene glycol dimethacrylate (SR-210) and diethylene glycol dimethacrylate (SR-231), all products of Sartomer. Of these, SR-209, SR-210, SR-423, SR-231, SR-205 and SR-206 are preferred. SR-209, SR-205, SR-210 and SR-231 are particularly preferred. High viscosity acrylic monomers and oligomers may be diluted with acrylic monomers and oligomers having lower viscosity to keep the viscosity of the paste composition within the acceptable range.

The radiation-reactive urethane oligomer component is mostly responsible for imparting toughness and gloss retention to the cured layer of the composition of the invention. It is an essential component for applications where superior surface toughness is required, such as flooring materials. For flooring applications the radiation-reactive urethane oligomer should normally be included into the composition, in an amount of at least 4 parts by weight. For applications less demanding in terms of the surface properties of the coating, such as wall coverings, the amount of this relatively expensive component can be reduced or eliminated.

The radiation-reactive urethane oligomer component has terminal, ethylenically unsaturated double bonds and can be prepared as follows. A diisocyanate or triisocyanate is reacted with a polyol, suitably a diol or triol. Hydroxy groups of the polyol react with isocyanate groups of the diisocyanate to form a polyurethane prepolymer. The molar ratio of isocyanate to polyol is chosen so that the polyurethane prepolymer has isocyanate terminal groups. This prepolymer is then reacted with a hydroxyalkyl acrylate or methacrylate ester. The hydroxy groups of the acrylate or methacrylate ester react with the terminal isocyanate groups of the polyurethane prepolymer, so that there is formed a urethane oligomer having terminal acrylate or methacrylate moieties. When the composition of the invention is subjected to radiation a polymerization reaction occurs at the double bonds of the acrylate or methacrylate moieties, creating bonds between molecules of the urethane oligomer. It is of course possible to use mixtures of diisocyanates and triisocyantes and of diols and triols. Use of trifunctional reactants will lead to crosslinking and result in urethane oligomers of higher viscosity, which may limit the amounts of trifunctional reactants that can be used.

Suitable diisocyanates for use in preparing the polyurethane prepolymer include 2,4- and 2,6-toluene diisocyanate, 1,4-phenylene diisocyanate, naphthylene diisocyanate, diphenylmethane diisocyanate, α,ω-alkylene diisocyanates such as hexamethylene diisocyanate, and isophorone diisocyanate. Suitable polyols may be any oligomers that can be prepared with hydroxy terminal groups, for example polycarbonates, polyesters, silicone materials, polyhydroxyalkylacrylates, polyhydroxyalkylmethacrylates, elastomeric materials such as polybutadiene diacrylate and polyepoxy materials.

Of the possible polyols to be used in the preparation of the urethane oligomer, silicone materials are very expensive. Polyesters result in oligomers of high viscosity. Polyhydroxyalkyl acrylate and methacrylate polyols result in urethane oligomers that, when used in compositions of the invention, do not always display the degree of toughness desired for flooring. Polyepoxy materials display a tendency to yellow, and are also undesirably rigid for flooring applications. For use in flooring, where a degree of toughness in the final product is desirable, it is preferred that the polyol is an aliphatic polycarbonate polyol, more preferably a triol and most preferably a diol. Aromatic polycarbonate polyols are not widely available, are in general too viscous and have a tendency to yellow. Suitable polycarbonate polyols can be based on alkylene glycols, ether glycols and alicyclic glycols or a mixture thereof. Preferred alkylene glycols include α,ω-straight chain glycols having between 5 and 10, most preferably 6 carbon atoms. An example of a preferred alkylene glycol is 1,6-hexane diol. In the alkylene glycol, one or more carbon atoms of the alkylene chain can be replaced by an oxygen atom, to form one or more ether linkages. An example of a preferred ether glycol is di-ethylene glycol.

Preferred alicyclic glycols include those having the following structure:

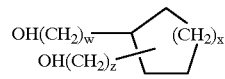

wherein:
x=1, 2 or 3
w=0 to 10
z=0 to 10

Preferably, x has the value 2, i.e., the alicyclic glycol is based on cyclohexane. It is also preferred that the substituents on the alicyclic ring are located in the 1,3- or 1,4-positions relative to each other. In the alicyclic glycol, one or more carbon atoms of the alkylene chain can be replaced by an oxygen atom to form one or more ether linkages. Also, one or more of the hydrogen atoms attached to a carbon atom of the alkylene chain can be replaced by a substituent that does not interfere with the course of the desired reaction, for example an alkyl group having between 1 and 4 carbon atoms. An example of a most preferred alicyclic glycol is 1,4-dimethanolcyclohexane.

Suitable polycarbonate polyols that are commercially available include KM10-1122, KM10-1733, KM10-1667 (all products of Stahl) and DESMOPHEN 2020E (product of Bayer).

Suitable hydroxyalkyl acrylates and methacrylates for reaction with the polyurethane prepolymer to form the polyurethane oligomer include hydroxyethyl, hydroxypropyl and hydroxybutylacrylates and methacrylates, of which the hydroxyethyl esters are preferred.

The urethane oligomers may have viscosity that is too high for convenient handling. If this is the case, the urethane oligomer can be mixed with an acrylic or methacrylic compound that can be used as a component of the composition. For example, a preferred urethane oligomer that is based on a polycarbonate polyol of molecular weight in the range of about 500 to 2000 forms with hydroxyethyl acrylate a urethane oligomer whose viscosity is higher than optimum for convenience of handling. This oligomer has been successfully used in a 3:1 by weight mixture with ethoxylated trimethylolpropane triacrylate. This mixture is commercially available from Stahl, U.S.A. of Peabody, Mass., under the designation U26253. It has a viscosity of about 100,000 cps at 60° C. when measured with a Brookfield viscometer using spindle number 3 at 10 rpm, is slightly yellowish in colour and has a slightly sweetish odour. The product may contain a small quantity of hydroxyethyl acrylate, as this compound may be used in molar excess when reacted with the urethane prepolymer to ensure complete reaction of the prepolymer. Any small excess of hydroxyethyl acrylate that is present in the U26253 is incorporated into the composition of the invention and is crosslinked with the other components during the irradiation step and has no significant effect on the properties of the cured composition.

Desirably the urethane oligomer has a fairly high molecular weight, say about 100,000 or higher. At lower molecular weights the product obtained may be undesirably brittle.

Other examples of suitable urethane oligomers include urethane acrylates CN-966 and CN-953, CN-966 E75 (urethane acrylate with ethoxylated trimethylol propane triacrylate) and CN-964 H75 (urethane acrylate with 2-(2-ethoxyethoxy)ethyl acrylate), all products of Sartomer. Of the urethane oligomers, U26253 is preferred.

Although the presence of a urethane oligomer is necessary to yield a material having sufficient toughness to serve as a wear layer for flooring, for applications where such toughness is not required it is possible to dispense with the urethane oligomer. If the polyvinyl chloride (PVC) resin and the acrylic or methacrylic compound are admixed and then heated, the acrylic or methacrylic compound solvates the polyvinyl chloride (PVC). It is possible to extrude the solvated PVC into a flexible, transparent sheet, for example. According to a further aspect of the invention, therefore, there is provided a radiation-curable composition which comprises a polyvinyl chloride (PVC) resin that is free of external and internal plasticizers, and is solvated by an acrylic or methacrylic compound.

Heat stabilizers known to those skilled in the art include compounds of alkaline earth metals and transition metals. Examples of heat stabilizers suitable for the compositions of the invention are BZ 512 (product of Ciba-Geigy) and Synpron 0144 (product of Synthetic Products Co.). Barium zinc stabilizer BZ 512 is preferred.

Photoinitiators are normally required for compositions cured by non-ionizing U.V. radiation. They may not be necessary in the case when the acrylic or methacrylic monomer and the radiation reactive oligomer polymeric network shows sufficient reactivity or has a photoinitiator built-in, so that no extra photoinitiator has to be added. When present, the photoinitiators should ensure quick and complete crosslinking of the composition which has been partially cured by a thermal treatment. The preferred photoinitiators are derivatives of phenyl ketone. Examples of suitable photoinitiators are Irgacure 184, Irgacure 907, Irgacure 2959, Irgacure 500, Irgacure 651 and Irgacure 369 (products of Ciba-Geigy) and Darocur 4265, Darocur 1173, and Micure HP-8 (products of Merck). Of these, Irgacure 184 is preferred.

Of the auxiliary components of the compositions of the invention, sterically hindered phenols, for example Irganox 1010 (product of Ciba-Geigy), are preferred as antioxidants. Organically modified siloxanes, such as BYK 3105 (product of BYK Chemie), are preferred as air release agents. Fatty acids, for example stearic acid, and their salts, for example zinc stearate and magnesium stearate, are preferred as lubricant. Fumed silica or a fine particle emulsion polyvinyl chloride (PVC) resin having relative viscosity of from 2.05 to 2.75 are preferred drying agents. Examples of suitable drying agents are Cab-O-Sil (product of Cabot Corporation) and Oxy 625 (product of Occidental Chemical Ltd.).

To prepare a low-viscosity paste, all the components are combined, thoroughly mixed to form a paste and the mixture is placed under vacuum, to eliminate any entrapped air. After the vacuum treatment, the paste is applied as a layer of a predetermined thickness to a substrate by conventional means, such as a reverse roll coater, a knife over roll, a screen coater, a spray gun or other applicable means. The substrate covered with the paste is then heated, for example in a circulating oven, to a temperature of from about 160° C. to about 220° C., preferably about 200° C. Upon heating, the liquid ingredients initially solvate the polyvinyl chloride (PVC) resin particles which then forms a solid homogeneous mass. As a result, the opaque layer of the paste is transformed into a clear thermoplastic film. When a composition of the invention is applied over a foamable thermoplastic vinyl plastisol layer, the composition has a sufficiently high melt viscosity that it serves as a barrier which prevents the escape of gases from the foamed underlayer when both films are fused. Consequently, and in contrast to the prior art, it is not necessary to provide an extra layer of a composition of high melt viscosity merely to avoid blistering and pin holes in the surface layer. The clear film, which leaves visible any underlying design, can be embossed or formed into any specific shape. The embossing can be done chemically or mechanically, in known manner. Once the shaping, if any, is terminated, the film is cured by exposing it to a non-ionizing or ionizing radiation, to crosslink the crosslinkable components and to freeze any design obtained by the embossing.

The crosslinking converts the flexible, thermoplastic film into a tough, stain and abrasion resistant layer. Since the film becomes transparent after the initial thermal treatment, even a thick film (10 mils or more) can be crosslinked quickly and completely by U.V. or E.B. irradiation. For U.V. radiation an inert gas, such as nitrogen, is used to displace oxygen which causes inhibition of the crosslinking on the surface. It is important that the film be completely crosslinked since any remaining free monomers or oligomers will tend to migrate to the surface of the coating, adversely affecting its wear properties.

Dry blend mixtures formulated with polyvinyl chloride (PVC) suspension resins are prepared suitably by heating the polyvinyl chloride (PVC) suspension resin to approximately 50° C.±15° C. while agitating in a high speed mixer, for example a Henschel mixer. The liquid portion of the composition, composed of the acrylic or methacrylic monomer and radiation reactive urethane oligomer, is then added gradually while the temperature is raised to about 80° C.±15° C. At this temperature the resin absorbs all the liquid. The dry blend is then cooled to about 50° C.±15° C., at which temperature drying agents may be added to ensure that the blend will remain dry when further cooled and stored.

The dry blend can be processed in various manners prior to irradiation. The mixture may be calendered on heated rolls (at a temperature of about 160° C. to 220° C., preferably about 200° C.) to an appropriate thickness (usually from 2 to 30 mils), to form a sheet which is stripped from the last roll, cooled and stored. This rolled film can be subsequently laminated, for example onto a hot, printed tile sheet, embossed if required, radiation-cured and cooled.

Alternatively, a layer of the dry blend mixture in the form of a powder may be applied to a substrate, for example a felt, using any known technique (squeegee, screen, etc.). The layer is then melted by heating to an elevated temperature by any suitable heating means, for example an air circulating oven or preferably by infrared. When heated to a temperature of from 160° C. to 220° C., preferably about 200° C., by calendering, the initially opaque mixture becomes transparent, which facilitates the final radiation curing when a non-ionizing radiation, such as U.V. radiation, is used. Another aspect of the invention consists of adding the suspension resin and the acrylic or methacrylic monomer, radiation reactive urethane oligomer, stabilizer, photoinitiator and other additives like lubricants, into a high shear Banbury mixer or a two rolls intensive mixer and forming a sheet on calender rolls.

By way of example, when a top protective layer is formed from a dry blend, the dry blend (20 mils) may be applied by knife coating over a felt substrate that has been coated with a printed or non-printed gelled vinyl film (10 mils). The coated felt substrate covered with the dry blend is then passed through an oven (for example 2 minutes at 200° C.) to melt the dry blend. If required, the product is cooled to room temperature. An embossing step, if present, is carried out on a textured cooling roll which reduces the temperature of the film. The following radiation curing step does not require any specific temperature.

The thermal gelling step can be carried out in an oven employing any suitable means for heat generation. For a low-viscosity paste, this step is preferably carried out in a hot air circulating oven. For a dry blend mixture or a high shear Banbury mixing, the thermal gelling is preferably carried out on hot calender rolls, although an infrared heater or hot air oven can be used to melt the dry blend, if the blend is applied as powder to a substrate. A suitable residence time for the thermal gelling is about 2±1 minutes for layers about 10 mils thick and at a temperature of about 200° C.±20° C. This time will depend, in general, on the temperature, the thickness of the layer and the relative viscosity of the PVC resin.

The radiation curing of the thermally gelled film may be carried out with a non-ionizing or ionizing radiation. Any source providing a non-ionizing radiation of the wavelength between about 180 nm and about 400 nm, preferably between about 250 nm and about 400 nm, can be used. Examples of suitable sources are medium pressure mercury lamps, non-mercury lamps having spectra different from mercury lamps (xenon arc, krypton arc, carbon arc, sunlamps) and pulse U.V. sources. Of these, the medium pressure mercury lamp is preferred. Most medium pressure (1 to 2 atm) mercury vapor arc lamps can operate consistently at 100 or 200 Watts per linear inch. The U.V. irradiation is preferably carried out under nitrogen blanket to eliminate oxygen inhibition on the top surface of the cured coating. The radiation intensity is typically between 100 and 700 watt/sq.ft., preferably about 150 watt/sq.ft.

An electron beam can be used as a source of ionizing radiation. When an electron beam is used to crosslink the reactive components no photoinitiator is required. Also, when cured with the electron beam, the cured film can be colored or opaque. Such films may be preferred for some applications, such as inlaid floor coverings, wall coverings and the like.

Although originally developed for flooring applications, the compositions of the invention can be used for many other applications requiring a tough coating, laminated or not to a substrate, such as wall coverings, table cloths, boat tarpaulins and covers and the like. Felts, woven or non-woven fiberglass, woven or non-woven polyester, nylon, jersey, cotton fabrics and the like can be used as substrates. Felts or calendered polyvinyl chloride (PVC) sheets are preferred for flooring applications. The compositions of the invention can also be used on non-supported polyvinyl chloride (PVC) flooring products, for example resilient sheet vinyl floor covering as described in ASTM Standard F1303, classes B or C (vol. 15.04). They can be used on foamable polyvinyl chloride (PVC) and ethylene-vinyl acetate (EVA) compositions. The polyvinyl chloride (PVC) or EVA composition contains a heat-activated blowing agent. The composition of the invention is applied over the polyvinyl chloride (PVC) or EVA foamable composition and the heat used to cure the composition of the invention also serves to activate the blowing agent, causing the polyvinyl chloride (PVC) or EVA composition to foam.

The thickness of the cured layer depends on its intended application. For single wear layers for flooring materials, this thickness will be typically in the range of from 1 mil to 50 mils, preferably from 7 mils to 15 mils, most preferably about 10 mils. The same thickness can be used for protective layers applied on the top of conventional thermoplastic plastisol layers. In this case the preferred thickness is 5±2 mils.

The examples which follow are illustrative of this invention and of the best mode contemplated by the inventors for carrying out the same, but are not intended as limiting thereof.

EXAMPLE 1

A paste containing

| | | |
|---|---|---|
| 1. | PVC emulsion resin (Oxy 75HC) | 100.0 pbw |
| 2. | tetraethylene glycol dimethacrylate (SR 209) | 55.0 pbw |
| 3. | urethane acrylate and ethoxylated trimethylolpropane triacrylate, 3:1 mix by weight (U26253) | 7.5 pbw |
| 4. | heat stabilizer (BZ 512) | 6.0 pbw |
| 5. | photoinitiator (Irgacure 184) | 1.0 pbw |
| 6. | siloxane air release agent (BYK3105) | 0.5 pbw |
| 7. | hindered phenol antioxidant (Irganox 1010) | 500 ppm | was prepared by mixing the components 2 to 7 and adding the PVC emulsion resin. The components were thoroughly mixed to form a low viscosity paste and placed under vacuum for 5 min. to eliminate any entrapped air. The low viscosity paste was applied over a printed foamable polyvinyl chloride (PVC) film on felt, using a reverse roll coater or knife coater. Those coatings were thermally cured in an air circulating oven for 2 minutes at 200° C., foamed, chemically and/or mechanically embossed and irradiated under a nitrogen blanket with U.V. radiation from a medium power mercury arc lamp (5 seconds at 150 Watts/sq.foot) of ultra violet radiation. The resulting 12-feet-long sheet was then cooled to room temperature and rolled-up. The coating had a good wear, stain and solvent resistance and excellent gloss retention.

EXAMPLE 2

A dry blend containing

| | | |
|---|---|---|
| 1. | Polyvinyl chloride (PVC) suspension resin (Oxy 160) | 100.0 pbw |
| 2. | tetraethylene glycol dimethacrylate (SR 209) | 50.0 pbw |
| 3. | urethane acrylate and ethoxylated trimethylol- | 15.0 pbw |

-continued

| | | |
|---|---|---|
| | propane triacrylate, 3:1 mix by weight (U26253) | |
| 4. | heat stabilizer (BZ512) | 4.0 pbw |
| 5. | photoinitiator (Irgacure 184) | 2.0 pbw |
| 6. | drying agent (Cab-O-Sil) | 1.0 pbw |
| 7. | drying agent (Oxy 625) | 2.5 pbw | was prepared in the following manner. The suspension resin was heated to 50° C.±5° C. while agitated in a Henschel mixer. The liquid components 2 to 5 were then gradually added while the temperature was raised to about 80° C. (±5° C.). After the liquid was absorbed by the resin, the dry blend was cooled to about 65° C., at which temperature the drying agents were blended in. The mixture was then calendered at a temperature of 185° C. to a thickness of 10 mils, laminated and simultaneously embossed onto a vinyl tile sheet which was then irradiated under a nitrogen blanket with radiation from a medium power mercury arc lamp (5 seconds at 150 Watt/sq.ft.). The sheet was further cooled and cut into tiles of various sizes. The coating had a good wear, stain and solvent resistance and an excellent gloss retention.

EXAMPLE 3

A mixture containing:

| | | |
|---|---|---|
| 1. | Polyvinyl chloride (PVC) suspension resin (Oxy 160) | 100.0 pbw |
| 2. | tetraethylene glycol dimethacrylate (SR 209) | 50.0 pbw |
| 3. | urethane acrylate and ethoxylated trimethylol-propane triacrylate, 3:1 mix by weight (U26253) | 15.0 pbw |
| 4. | heat stabilizer (BZ512) | 4.0 pbw |
| 5. | photoinitiator (Irgacure 184) | 2.0 pbw |
| 6. | lubricant (Stearic acid) | 1.0 pbw | was prepared in the following manner. All ingredients were loaded into a Banbury mixer and mixed under sufficient pressure, high rotor speed and temperature to produce a hot viscous paste which has extruded or calendered at a temperature of 185° C. to a thickness of 10 mils, laminated and simultaneously embossed onto a substrate. Substrates were vinyl tile sheets which were then irradiated under a nitrogen blanket and further processed as in example 2.

EXAMPLE 4

Impact of components and curing conditions on physical properties of coatings was studied using the components from Example 1. Results of these studies are summarized in Table 1. Composition A contained only the components 2, 3 and 5 (acrylic monomer, urethane oligomer and photoinitiator) and was cured by U.V. radiation only. Compositions B and C were complete compositions of Example 1 and were cured by thermal fusion only (B) and by thermal fusion followed by U.V. irradiation (C). Films were prepared on a release paper which was removed prior to measurements. Tensile strength was measured using 1×3 inch samples with a Lloyd tensiometer. Solvent resistance was measured using Taber scrub machine and methyl ethyl ketone (25 cycles).

TABLE 1

| Composition | film thickness(d) [mils] | tensile strength(T) [lbs] | elongation [%] | solvent resistance | T/d |
|---|---|---|---|---|---|
| A. | 6 | — | 0 | excellent | brittle |
| B. | 9 | 24 | 460 | poor | 2.66 |
| B. | 9 | 8.6 | 450 | poor | 0.96 |
| C. | 7 | 60 | 25 | excellent | 8.57 |
| C. | 8 | 88 | 25 | excellent | 8.76 |
| C. | 6 | 40.2 | 25 | excellent | 6.7 |

The above results show clearly that the film prepared from the crosslinkable components only (acrylic monomer+ urethane oligomer) does not have sufficient mechanical strength and flexibility.

(A) Adding the polyvinyl chloride (PVC) resin and curing the composition by thermal fusion only, without radiation curing, results in a highly flexible coating having an acceptable tensile strength but having a poor solvent resistance.

(B) Curing the same composition by thermal fusion and U.V. radiation results in a good tensile strength, an acceptable flexibility and an excellent solvent resistance.

EXAMPLE 5

Various acrylic or methacrylic monomers and urethane oligomers were evaluated by direct substitution in the basic formulation of Example 1. The results of these evaluations are summarized in Tables 2 and 3.

The stain resistance was measured using stainants like Kiwi brown shoe polish, mustard, tincture of iodine and asphalt sealer. The stainants were applied for 1 hour, 24 hours and 7 days at room temperature

TABLE 2

| acrylic monomer | monomer's viscosity | air release | colour of coating | stain resistance | comments |
|---|---|---|---|---|---|
| Monofunctional acrylates | | | | | |
| SR-339 | — | — | slight haze | good | yellow |
| SR-285 | very high | poor | — | poor | fuses in pot |
| SR-395 | 400 cps | none | yellow | good | cracks on fusing |
| SR-506 | — | fair | clear | good | odor, cracks |
| Diacrylates | | | | | |
| SR-344 | high | poor | white | poor | opaque, spueing |
| SR-306 | high | poor | milky | poor | — |
| SR-259 | very high | poor | slightly milky | — | clear, spueing |
| Pentaacrylates | | | | | |
| SR-399 | extremely high | poor | slightly yellow | poor | viscosity too high |
| Methacrylates | | | | | |
| SR-242 | very high | poor | — | — | cracks on fusing |
| SR-423 | good | poor | milky | good | thixotropic |
| SR-2100 | fair | — | milky | poor | — |
| SR-454 | very high | — | — | — | — |
| Dimethacrylates | | | | | |
| SR-252 | — | — | — | poor | — |
| SR-239 | — | — | — | poor | — |
| SR-206 | fair | poor | slight haze | good | slight |

TABLE 2-continued

| acrylic monomer | monomer's viscosity | air release | colour of coating | stain resistance | comments |
|---|---|---|---|---|---|
| SR-209 Trimethacylates | low | none | clear | good | odor best |
| SR-350 | fair | good | clear | poor | |

TABLE 3

| Urethane oligomers | | | | |
|---|---|---|---|---|
| CN-966 | high | — | clear | poor |
| CN-966E75 | high | — | clear | poor |
| U26253 | very high | — | clear | good |

The evaluation indicates that most monofunctional acrylates solvate rapidly the polyvinyl chloride (PVC) resin, resulting in compositions of high viscosity. Several products, such as SR-506 (isobornyl acrylate), give coatings acceptable for flooring applications. Some difunctional acrylates (e.g., SR-344 and SR-306) and multifunctional acrylates (e.g., SR-399) tend to produce compositions having high viscosities and films which are colored or milky. Some of these acrylates also show an incompatibility with the basic composition, resulting in spueing of the component over the surface of the cured coating.

Most of the evaluated acrylics make acceptable films and may be used in the compositions of the invention. Of those, SR-209, SR-506 and SR-423 are considered to be the best suited for flooring applications. Those with high viscosities may be modified by the addition of low viscosity acrylates or methacrylates.

What we claim as our invention is:

1. A process for applying a wear layer to a flooring material, wherein the process comprises applying to the flooring material a coating composition comprising (i) a polyvinyl chloride (PVC) resin, (ii) an acrylic or methacrylic compound and (iii) a radiation-reactive urethane oligomer, where said composition is substantially or completely free of internal or external plasticizers, heating to heat-cure the coating composition and irradiating the composition to radiation-cure the coating composition.

2. A process according to claim 1 wherein the PVC resin is a PVC suspension resin, the coating composition is heat-cured and formed into a laminate before the composition is applied to the material, the laminate is applied to the material and then radiation cured.

3. A process according to claim 1 wherein the PVC resin is a PVC suspension resin and the coating composition is applied to the material before the composition is heat-cured and radiation-cured.

4. A process according to claim 1 wherein the PVC resin is a PVC emulsion resin and the coating composition is applied to the material before the composition is heat-cured and radiation-cured.

5. A process according to claim 1 wherein the material to be coated comprises a foamable PVC plastisol, the coating composition is applied to the foamable PVC plastisol and is heated to cure the coated composition and also to cause the PVC plastisol to foam.

6. A process according to claim 5 wherein after the heating but before the irradiating, the foamed plastisol and heat-cured coating composition are embossed.

7. A process according to claim 1 wherein the PVC resin is a PVC emulsion resin with a relative viscosity between 2.05 and 3.40 and the components of the coating composition are admixed to form a paste and are freed of any entrapped air before the composition is heated.

8. A process according to claim 1 wherein the PVC resin is a PVC suspension resin that has a relative viscosity between 1.56 and 2.52 and the components of the coating composition are admixed with heating to form a dry powder before the composition is heat-cured.

9. A process according to claim 1 wherein the radiation-reactive urethane oligomer is based on an aliphatic polycarbonate polyol.

10. A process for coating a wall covering material or a flooring material, wherein the process comprises:

applying to the wall covering material or the flooring material a heat-curable and radiation-curable coating composition, the coating composition comprising:
(i) a polyvinyl chloride (PVC) resin; and
(ii) an acrylic or methacrylic compound, wherein the coating composition is substantially or completely free from internal or external plasticizers; and heating to heat-cure the coating composition and irradiating the composition to radiation-cure the coating composition.

11. A process according to claim 10 wherein the PVC resin is a PVC suspension resin and the coating composition is applied to the material before the composition is heat-cured and radiation-cured.

12. A process according to claim 10 wherein the PVC resin is a PVC emulsion resin and the coating composition is applied to the material before the composition is heat-cured and radiation-cured.

13. A process for applying a composition to a wall covering material or a flooring material, the process comprising:

heat-curing the composition and forming the composition into a laminate, the composition comprising,
(i) a polyvinyl chloride (PVC) suspension resin; and
(ii) an acrylic or methacrylic compound, wherein the composition is substantially or completely free from internal or external plasticizers;

applying the laminate to the wall covering material or the flooring material; and radiation-curing the laminate after application of the laminate to the wall covering material or the flooring material.

* * * * *